Sept. 1, 1964 E. J. BRYNER ETAL 3,146,805

LEAD STRAIGHTENING MACHINE

Filed Nov. 8, 1961

*INVENTORS*

ERNEST J. BRYNER

JOSEPH N. IANUZZI

*BY* Hall + Houghton

*ATTORNEY*

United States Patent Office 3,146,805
Patented Sept. 1, 1964

3,146,805
LEAD STRAIGHTENING MACHINE

Ernest J. Bryner, Custer City, and Joseph N. Ianuzzi, Bradford, Pa., assignors to Sigma Engineering Service, Inc., Custer City, Pa., a corporation of Pennsylvania
Filed Nov. 8, 1961, Ser. No. 150,943
7 Claims. (Cl. 140—147)

The present invention relates generally to article straightening devices, and more particularly to a device for straightening thin deformable end members which project from each end of a large elongate body portion, such as the leads on capacitors and resistors.

In modern automated plants for producing electrical components and the like, the bulk handling of these articles often causes the leads to be bent subsequent to their manufacture. This creates disturbances in subsequent manufacturing when these components are to be connected or incorporated into electronic devices. In some instances, manual assembly line techniques are used for constructing these electronic devices, and in other instances they are completely automatic. In either case, when the leads of these components are bent out of shape and not in proper axial alignment, disturbances are caused which lead to inefficiency.

As a result of this, machines have been devised in the past for straightening the leads of electronic components subsequent to their manufacture and prior to their incorporation into electronic instruments and devices. Some of these devices provide a cooperating roller and flat plate with the straightening to take place between the moving roller and the flat plate. However, the period of simultaneous contact of the leads between these two elements is extremely short, and therefore proper straightening could not possibly be assured with this type of device.

In other devices the rollers are axially fixed on a shaft so that when components having body portions of different length are to be processed on the same assembly line, more than one aligning machine must be provided. Other of these machines provide carriers for the body portions which create disadvantages in that these carriers inevitably create resistance to turning of the component and therefore retard the straightening operation. In many of these devices only one roller and anvil are provided so that only one lead can be straightened at any one time. In other devices the shoe or anvil is vibrated to hammer the leads into shape, but this only tends to weaken the structural stability of the leads, which are already quite deformable. In some instances, the body of the component is rotatably driven, and this creates problems, since the movement of the leads between the anvil and the roller member is not always constant and therefore this type of device creates more problems than it solves.

In other devices which have been provided, the period of simultaneous contact of the leads between the roller and the shoe is so short that there is not sufficient straightening prior to the discharge of the component from the machine.

With these defects of the prior art in mind, it is a primary object of the present invention to provide a machine for automatically straightening both leads of electronic components, such as resistors and capacitors.

Another object of this invention is to provide a machine of the type described which automatically adjusts to the proper diameter of the lead wires to be straightened.

A further object of this invention is to provide a lead straightening machine wherein adjustment is provided for the length of the article so that substantially the entire length of the leads may be straightened.

A still further object is to provide a device which automatically exerts a greater pressure on those leads which are further out of alignment.

Yet another object of this invention is to provide a device wherein the speed and thus the working torque on the components is adjustable, and wherein proper alignment is obtained in only one pass through the machine.

These objects and others ancillary thereto are accomplished according to preferred embodiments of the invention, wherein a machine frame is provided having a guiding track along which resiliently mounted shoes may be selectively adjusted. Spaced from this track, is a rotating shaft on which a pair of rollers is provided, each in alignment with a shoe. The rollers are likewise selectively axially adjustable along the shaft, whereby one or both of the roller and shoe pairs may be adjusted so that the distance between them may accommodate the component body and the adjustment may be such that substantially the entire lengths of the leads (all of the leads except about $\frac{1}{32}$ inch near the component body) are acted upon during the actual working operation. A shaft is driven by a belt device from a motor which is a variable speed device, so that the speed and thus the working torque on the component may be adjusted.

A novel feature of the device resides in the universal mounting of the pressure shoe on the shoe mount, so as to allow movement of the shoe with respect to the roller.

Another novel feature lies in the elimination, in this type of device, of a positive driving mechanism, allowing the functions of driving the element to be straightened through the device and ejecting it from the device to be assumed by the straightening elements.

These together with other objects and advantages which will become subsequently apparent, reside in the details of construction and operation as more fully hereinafter described and claimed, reference being had to the accompanying drawings forming a part hereof, wherein like numerals refer to like parts throughout, and in which:

Figures 1, 2:
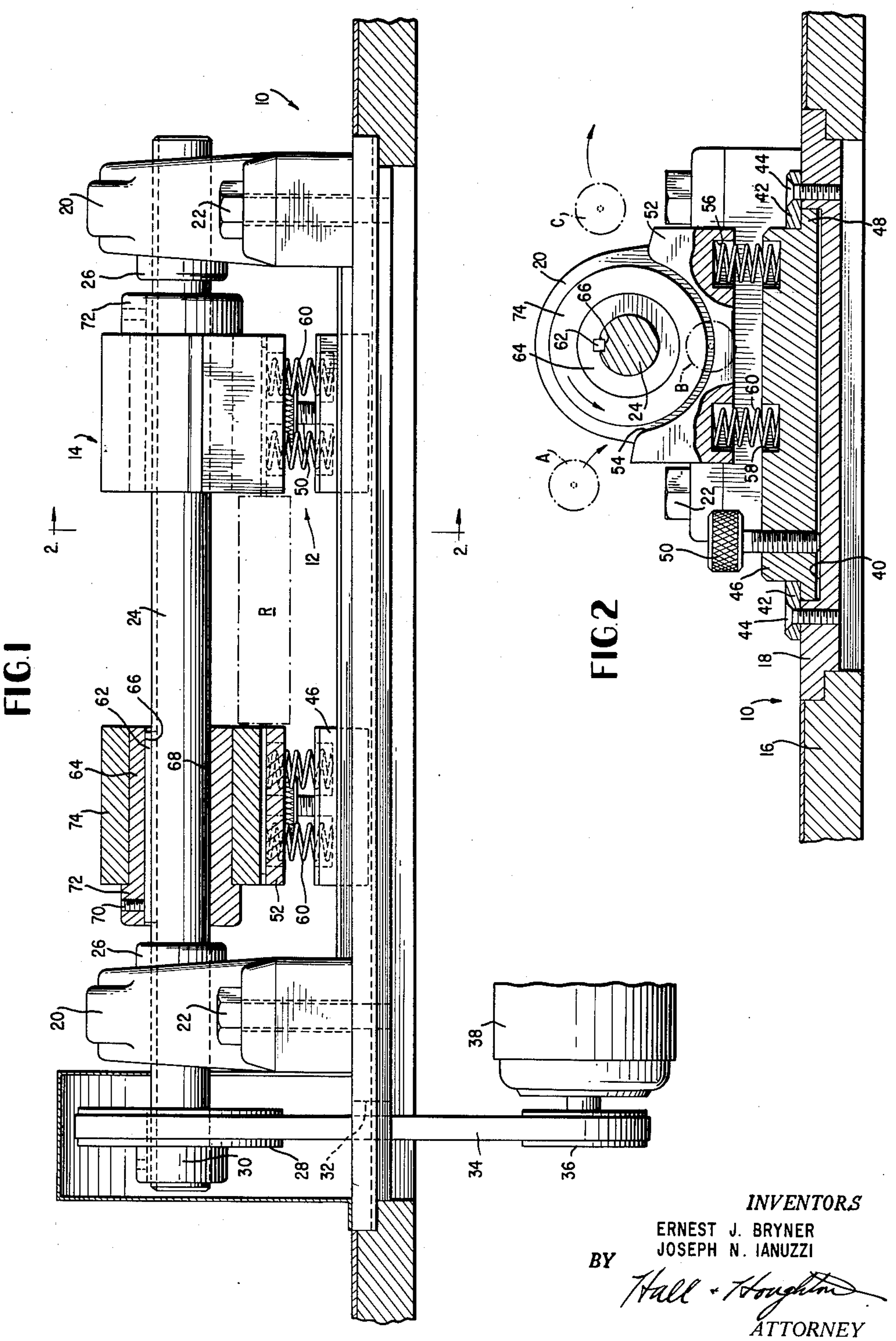
FIG. 1 is a front elevational view of the device partly in section.
FIG. 2 is a vertical sectional view taken substantially along the plane defined by reference line 2—2 of FIG. 1 and illustrating the details of construction of the shoe mounting means.

With more particular reference to the drawings, the machine basically comprises a frame 10 on which a pair of resiliently supported shoes 12 are adjustably supported. A pair of working rollers 14 are rotatably mounted for movement which, in cooperation with the working surface of the shoes 12, performs the straightening operation.

The machine frame 10 may be mounted in the upper surface 16 of a working table or the like which may be provided with casters for convenience of movement in a plant. The frame 10 includes a frame plate 18 which is rabbeted with the table surface 16 and fitted into an opening provided therein. A pair of bearings 20 are mounted one on each end of frame plate 18, by means of bearing mounting bolts 22.

A shaft 24 is rotatably mounted in bearings 20 and projects from one end thereof for a purpose which will be explained in detail below. A pair of collars 26 are fixed to the shaft by means of set screws or the like and the outer edges of these collars engage inner abutting surfaces of bearings 20. When the set screws are loosened, they may slide thereon for properly mounting and retaining the shaft between the bearings and to prevent axial movement of the shaft therein. A pulley 28, having an integral collar 30, is mounted on the projecting portion of the shaft and fixed thereto by means of a set screw or the like mounted in collar 30.

This end of frame plate 18 is provided with a slot 32 through which a drive belt 34 may pass and which is disposed about pulley 28. The other end of belt 34 passes over a drive pulley 36 which is mounted on the drive shaft of a motor 38. This motor is a variable speed or speed adjustable motor and is preferably mounted on a floating base.

The central portion of frame plate 18 is provided with a rectangular recess 40 which is elongated in the direction of shaft 24. A pair of overlying frames 42 are mounted to the upper surface of frame plate 18 by means of bolts 44 or the like, and project over recess 40 so as to define, together with the recess, a channel having an undercut slot along each side thereof.

Each shoe 12 is mounted upon a shoe base 46 which is generally rectangular in cross-section, but has a pair of flanges 48 projecting from the lower sides and which are disposed in the aforementioned undercut channel. This shoe base 46 is freely slidable along the channel, but may be selectively locked in position by means of a set screw 50 which is threaded through shoe base 46 and engages the lower surface of recess 40, whereby a locking action is provided due to the upward pressure of flanges 48 against flanges 42.

A pair of shoes are provided, each being constructed of a shoe body 52, the upper surface of which has a concave portion 54 provided therein and which is of constant radius. The lower surface of shoe body 52 is provided with recesses 56 which are disposed above corresponding recesses 58 in the upper surface of shoe base 46. A coil spring 60 is provided between each of the recesses 56 and 58 and is firmly connected thereto, whereby each shoe 12 is resiliently mounted upon its base 46.

A pair of rollers 14 are provided on shaft 24, and each is selectively axially adjustable along the shaft so as to be in alignment with one of the shoes. Shaft 24 has a pair of spaced splines 62, or if desired it may have a single spline, on which a mounting sleeve 64 is provided, and which has a keyway 66 provided for accommodating spline 62 and a central opening 68 for accommodating shaft 24. A set screw 70 provided in a reinforced portion 72 at the outer end of the sleeve, may be used for locking roller 14 to shaft 24 so that axial movement therebetween cannot take place. An outer or working sleeve 74 is provided upon sleeve 64, and this outer sleeve actually performs the work and contacts the leads of the electrical components. This sleeve may be constructed of any suitable material such as "textalite," and may be replaced when worn.

In use, an electrical component such as the one designated R in dot-dash lines in the drawings and which is to have its leads straightened, is first used for adjusting the proper settings of the machine. The body portion of resistor R is disposed between the aligned rollers 14 and shoes 12 and if it cannot be fitted therebetween or if there is too much space, the set screws 70 and 50 of the roller and shoe, respectively, are loosened. Then, the roller and shoe are moved as a unit and adjusted to be just slightly further apart than the length of the body portion of the resistor.

These springs 60 are so adjusted that the concave surface 54 of this shoe will not contact the outer surface of sleeve 74 but will always be just slightly spaced therefrom. If desired a stop member may be provided to limit the biasing movement of shoe 52 from its base 46 to prevent contact between shoe and roller. When the proper adjustment is effected, the set screws 70 and 50 are tightened. Then, as indicated by resistor position A in FIG. 2, the resistors may be fed into the inlet of the machine where the body portion of resistor R is completely free of the machine and is only retained because the leads attached thereto are disposed between the rollers and shoes.

Any misalignment of the leads will cause greater contact between surface 54 and the outer surface of sleeve 74 than would occur if perfect alignment were provided. The greater the misalignment of the leads, the more the shoe 52 is biased away from roller 14 and the greater is the spring pressure. Thus, the more the misalignment the greater the pressure exerted. Also, the misalignment which is present, is greatest when the resistor is initially placed into the machine and after it has just passed position A. At this point the surface 54 will be the furthest from roller 14 due to the misalignment being greatest at this point. By the time resistor R has attained position B, the alignment of the leads has already been established, and as the resistor approaches the final portion of this working slot between surface 54 and the external surface of the roller, a final alignment of the resistor leads is secured. It should be noted that since there is perfect alignment in the latter part of this slot, and the greatest misalignment occurs at the initial portion of this slot, the entire shoe 52 may be pivoted somewhat counterclockwise (as viewed in FIG. 2), so that the slot is self-adjusting and will usually be larger at the inlet portion than at the outlet portion.

Since the shoes are provided vertically below the rollers, the components being operated upon by the machine have no gravitational tendency to discharge from the machine, but are only discharged therefrom by frictional driving contact with roller 14 and surface 54. The machine will not jam or clog during operation because the shoes are yieldably mounted, and the components are completely free of the machine other than for the contact of the leads between roller 14 and surface 54.

The speed of motor 38 is adjustable for changing the handling capacity of the device depending upon the characteristics of the components to be handled, and this will also change the working torque exerted on the leads, which again varies depending upon component characteristics. For example, the speed would be changed when operating upon components having different lead diameter in order to increase the friction when working upon thicker wire.

It should be noted that the angular distance of contact of the leads with the shoe surface 54 and roller 14 is substantially greater than 90 degrees, and therefore proper straightening may be performed in but a single pass through the device.

It may now be seen that an extremely versatile, useful, and efficiently operating lead straightening device has been provided which accomplishes many objects and has many features which are not found in the prior art.

The foregoing is considered only as illustrative of the principles of the invention. Further, since numerous minor modificatons and changes will readily occur to those skilled in the art, it is not desired to limit the invention to the exact construction and operation shown and described, and accordingly all suitable modifications and equivalents may be resorted to, falling within the scope of the appended claims.

We claim:

1. A device for axially straightening elongated articles of the type having a large body portion and thin deformable end members projecting from each end, comprising a frame, a guiding track mounted thereon, a shaft journalled in said frame and spaced from and parallel to said track, a pair of end members engaging and aligning rollers constituting the only means for moving the articles through the device, means mounting said rollers for angular movement with said shaft and selectively axial adjustment therealong, a pair of resiliently mounted pressure shoes adapted to be aligned with said rollers and having concave surfaces generally conforming to the peripheries of the respective rollers and normally slightly spaced therefrom to engage opposite sides of said end members and straighten them while moving the articles through the device, means mounting said pressure shoes for selective movement along said track, whereby said shoes and rollers may be adjusted to the length of said body portion and substantially the entire end members may be subjected to straightening action between said rollers and said shoes.

2. A device as defined in claim 1, wherein said track includes an undercut channel, and each pressure shoe mounting means includes a base having flanges projecting into the undercut portions of said channel, a setscrew in said base and engageable with said channel for preventing axial movement between said roller and said shaft, and springs interposed between said shoe and said base and being the only support for said shoe.

3. A device as defined in claim 1, wherein the concave surfaces of said shoes encircle said rollers for substantially more than 90 degrees.

4. A device as defined in claim 1, wherein said shoes are disposed vertically below said rollers.

5. A device for axially straigthening elongated articles of the type having a large body portion and thin deformable end members projecting from each end, comprising, in combination:

a frame;

a guiding track mounted thereon;

a shaft journalled in said frame and spaced from and parallel to said track;

a pair of rollers constituting the only means for moving the articles through the device;

means mounting said rollers for angular movement with said shaft and relatively axial adjustment therealong;

a shoe mount associated with each roller and movable on said track;

a pressure shoe for each shoe mount;

means universally mounting each pressure shoe on a respective shoe mount for small rectilinear and angular movements in all directions with respect thereto, said pressure shoe having a concave surface spaced slightly from, and conforming substantially to the curvature of the surface of its associated roller, whereby said shoes and rollers may be adjusted to the length of said body portion and substantially the entire end members may be subjected to straightening action between said rollers and said shoes.

6. A device as defined in claim 5, wherein said pressure shoe mounting means comprise springs.

7. A device as defined in claim 6, wherein said shoes are disposed vertically below said rollers.

References Cited in the file of this patent

UNITED STATES PATENTS

| | | |
|---|---|---|
| 2,858,873 | Snow | Nov. 4, 1958 |
| 2,867,262 | Ainsworth et al. | Jan. 6, 1959 |
| 2,935,097 | Wohlman | May 3, 1960 |
| 3,002,539 | Rus | Oct. 3, 1961 |